May 24, 1938.   A. C. PETERSON   2,118,571
CHARGE STRATIFICATION DUAL CHARGING INTERNAL COMBUSTION ENGINE
Original Filed Jan. 20, 1933
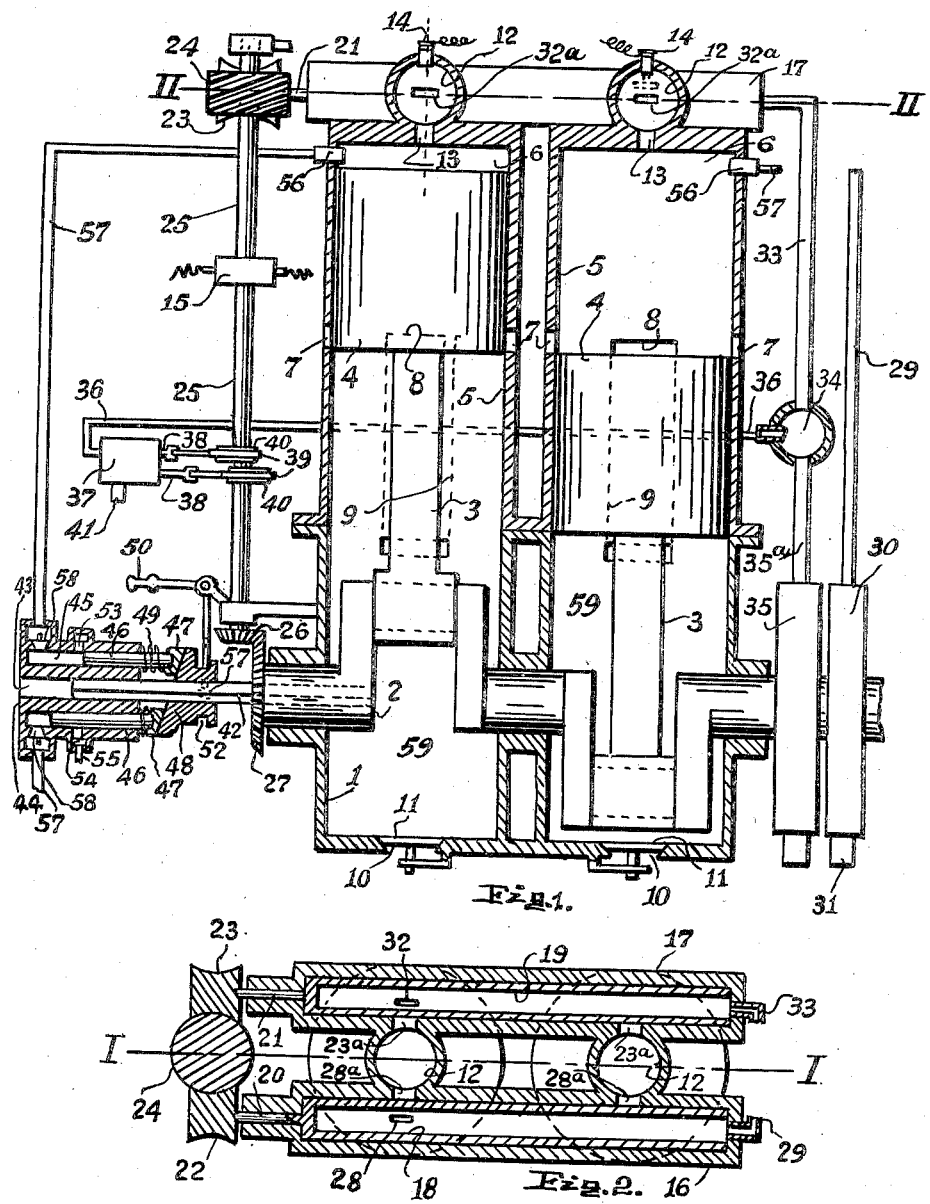
Inventor
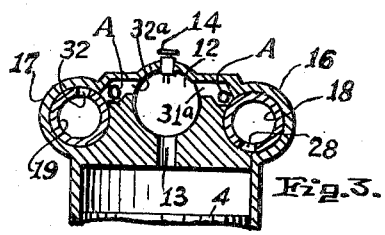
Adolph Peterson.

Patented May 24, 1938

2,118,571

UNITED STATES PATENT OFFICE 2,118,571

CHARGE STRATIFICATION DUAL CHARGING INTERNAL COMBUSTION ENGINE

Adolphe C. Peterson, Edina, Minneapolis, Minn.

Application January 20, 1933, Serial No. 652,747
Renewed October 8, 1937

6 Claims. (Cl. 123—65)

My invention relates to internal combustion engines and particularly to a form of internal combustion engine which embodies a means for stratification of the charge and therefore it is called a charge stratification, dual charging internal combustion engine.

The principal object of my invention is to provide a form of internal combustion engine which shall be simple in construction, cheap in manufacture and reliable in operation while at the same time having certain features. A principal object of my invention is to provide a form of internal combustion engine which provides stratification of the charge and therefore is adapted to the use of lower compressions than the usual injection engine, while at the same time having certain advantages of the injection type of engine. A principal object is to provide a form of engine which has a simple form of delivery and distribution of a primary charge as a stratification charge, and in combination with a supplementary charging means for the delivery of fuel which thereby provides a dual form of charging means. An object is to provide in connection with the novel system a particular form of charge distribution for the primary charging system. An object is to provide in connection therewith a novel form of control of the supplementary or main portion of the fuel charge. In general the object is to provide an improved form of internal combustion engine which shall be efficient due to the utilization of the advantage of a uniform charge of air while providing efficient combustion and ignition of the charge when lesser charges are used for delivery of lesser powers from the engine.

The principal devices and combinations of devices comprising my invention are as hereinafter described and as defined in the claims. In the accompanying drawing which illustrates my invention like characters refer to like parts throughout the several views.

Referring to the drawing:

Figure 1 is a view chiefly in vertical section on the line I—I of Figure 2, this view showing some parts in full side elevation and showing some parts broken away.

Figure 2 is a plan view of the device shown in Figure 1, this view showing some parts in plan view and other parts in horizontal section on the line II—II of Figure 1.

Figure 3 is a view in section on a vertical plane at right angles to that of Figure 1 but showing only a partial section to illustrate a modified form of control of the delivery of the primary charges to one cylinder of the engine.

Referring again to the drawing, the numeral 1 indicates a crank case, 2 the crank shaft, 3 the crank rods, 4 the pistons, 5 the cylinders, 6 the main combustion space, 7 the side-wall exhaust as in two-cycle engines, 8 the side wall inlet ports as in two cycle engines, 9 the passage from the individual crank compartment for delivery of air charge from the crank compartment to the individual cylinder, 10 the air suction port to the crank case individual compartment for atmospheric air, 11 the suction valve controlling the air suction port 10 of the individual cylinder. In the form described the engine presents the usual features of a two cylinder internal combustion engine of the two cycle type, it being understood that any form of combination of cylinders may be used and any form of air charging for receiving the main charge of air to each cylinder. That it is contemplated that the particular features of my system may be used in a four cycle type engine also, but my system is preferably employed in a two cycle type of engine and it is therefore illustrated as embodied in a two cycle type of engine.

Each cylinder of the engine has a so-called supplementary combustion chamber 12 which is relatively smaller than the main combustion space 6 at maximum compression and is permanently in communication with its related main combustion space 6 by means of a related small passage 13. The latter passage is of such small size that it will restrict communication so that there will be relatively slow or slight communication between the main combustion space and the supplementary combustion chamber 12 except under the force of large differences of pressure in the two spaces. Each primary combustion space 12 has a related spark plug 14 which is adapted to make sparks for combustion in the primary combustion space at a period relative to the cycle of the cylinder, either at maximum compression or slightly before that time, and this is procured by the distributor 15 which is diagrammatically illustrated and will receive current and distribute it in the usual manner for causing the sparks, this system being only shown diagrammatically as it is understood that any of the customary types for this purpose may be employed.

Two cylindrical valve casings 16 and 17 respectively are constructed or formed integrally with the cylinder heads of the engine and there are rotatable in these valve casings, respectively, the two rotatable valves, 18 the primary air scavenging charge valve, and 19 the primary fuel and air charge valve. These rotatable valves are fixed to shafts 20 and 21 respectively and the latter are rotated by worm wheels 22, and 23 respectively, the latter being driven by a common worm 24 located between the two worm wheels 22 and 23. The worm 24 is fixed to the vertical shaft 25 and the latter is driven by the mitre gears 26, 27 and thereby by the crank shaft of the engine.

The rotatable valves are each operated at the same speed as the crank shaft of the engine for use in the type of engine shown, the two cycle type, but it is contemplated that they would be driven at a different speed for use in a four cycle type of engine. The air scavenging valve 18 has ports 28, one for each cylinder, which port is adapted to admit air from the bore of the valve to its related primary combustion chamber 12 once during each cycle of the related cylinder and this admission would preferably be at a period just after the closing of the side wall ports of the cylinder by the ascending piston, or during the compression stroke of that piston, but may be during the period of the main exhaust of the cylinder by means of the exhaust ports 7. The bore of the primary air scavenging valve 18 is open at the one end as shown and at that end is adapted to receive continuously under operation of the engine, air under a low compression of say 10 to 20 pounds or more depending on the period of admission to the primary combustion chamber of any cylinder from the conduit 29; and the latter will receive air under compression from the blower 30 which may be of the Roots blower type or any type adapted to provide the necessary compression of the air received from atmosphere from the air intake 31. The blower 30 is driven by the crank shaft of the engine and is only diagrammatically shown since any type of such blower or blowers may be used, and no invention is claimed in the form of the blower.

The primary fuel and air charge valve 19 has ports 32, one for each cylinder which ports are adapted to admit a charge of mixed air and fuel from the bore of the valve to the related supplementary combustion chamber 12 at a period during the compression stroke, which is preferably immediately after the closing of the communication between the primary combustion chamber and the bore of the primary air scavenging valve. This period of delivery of the fuel and air charge to the primary combustion chamber 12 may be any time during the compression period but is preferably at such time as to secure adequate admission without the necessity of a large or high compression of the air therefore. The bore of the primary fuel and air charge valve 19 is open at one end as shown and at that end receives air and fuel continuously as needed under a compression of say 10 to 20 pounds but slightly more than the pressure in the conduit 29, and this air and fuel charge is received from the conduit 33, and the latter receives the charge from a mixture chamber 34, to which there is continuously delivered air under compression from the blower 35 (preferably of the Roots type) and fuel under a sufficiently high pressure from the conduit 36, the latter receiving fuel under pressure from the fuel pump 37. The fuel pump 37 has two pistons 38 which are operated by the connecting rods 39, the latter reciprocated by the eccentrics 40 on the vertical shaft 25. The pistons 38 are adapted to deliver continuously under operation a quantity of fuel which has a permanent relation to the cycle of the individual cylinders, and is of such amount that there will be provided for the primary combustion spaces or chambers 12 an amount of fuel sufficient to provide a combustible mixture with a charge of air for the chamber 12 filling the chamber, so that the charge will readily ignite at each cycle of the related cylinder. The chambers 12 are of such size that they will contain a mixture of air and fuel which is substantially just sufficient as a fuel and air mixture to provide that amount of combustion and power in the cylinders which will procure continuous operation idling without power delivery of the engine, but so that no appreciable amount of power more than this will be provided by the primary air and fuel charge. This fuel charge is continuous and not susceptible of variation during the operation of the engine. The fuel pump 37 receives fuel from a supply conduit 41.

The crank shaft of the engine has at the end opposite to the blowers a square or hexagonal bore wherein there is slidable axially a square or hexagonal shaft end 42 of the pump shaft 43. The opposite end of the pump shaft is round so that it can rotate in the pump casing 44 as a bearing. The pump casing 44 contains a plurality of cylinders 45 each parallel to the axis of the shaft 42 and they are of a number equivalent to the number of the cylinders of the engine. There are reciprocable in the pump cylinders 45 fuel pistons or plungers 46 of similar number and these at their outside ends bear against shoes 47 which in turn bear against the wabble block 48 which is rotated uniformly with the shaft 42 and thus uniformly with the crank shaft of the engine. Individual springs 49 yieldably thrust the fuel pistons or plungers 46 outwardly against the wabble block. The shaft 42 and thus the wabble block 48 is slidable axially by means of hand lever 50 and the pins 51 operating in connection with the circumferential groove 52 in the wabble block. The position of reciprocation of the fuel pistons 46 relative to the side ports 53 in the pump cylinders 45 is thus variable to permit variation of the quantity of the fuel discharged to the suction passage 54 which latter draws fuel from the supply conduit 55. The fuel plungers 46 may thus be made to deliver a variable quantity of fuel to each cylinder injection nozzle 56 by means of the individual conduits 57 (one connected with each pump cylinder 45, the check valve 58 being interposed). The nozzles 56 individually deliver to the main combustion spaces 6 of the engine. There is thus provided a means for the variable delivery of fuel to the main combustion spaces 6 of the engine and the fuel thus cyclically delivered to each will be not more than just sufficient for combustion at maximum combustion with the air which may be delivered at the maximum for efficient or maximum power of the engine. Thus all variation of the power of the engine will be by means of the fuel plungers 46, by wabble block 48, and lever 50.

In the operation of the engine, the individual crank compartments 59 individually draw air from the atmosphere which is compressed to say 5 or more pounds and delivered through the individually associated passage 9 at the period of minimum pressure into the cylinders, when the related pistons uncover the side wall exhaust ports of the cylinders, for scavenging of the cylinders by means of their main exhaust wall ports. The cycle of each cylinder then comprises the admission of scavenging air for the supplementary combustion chamber 12 immediately or slightly after the closing of the main ports of the cylinder, then after the closing of the communication with the primary air scavenging charge, admission of the primary fuel and air charge to the supplementary combustion chamber 12 and thereupon at or just prior to the maximum compression in the cylinder, the occurrence of an ignition spark in the supplementary combustion chamber 12, and thereupon combustion in the supplementary combustion chamber 12, and such combustion in the main combustion space as is provided by the fuel charge which may have been admitted thereto, the latter supplementary fuel charge having been admitted (subject to the control of the operator) at any time during the compression stroke, as will be found most efficient.

While I have shown the use of injection means for the provision of the main fuel charge to my engine, I contemplate that there may be utilized instead with my means for the supplementary combustion chamber charges, the customary or usual means of providing charging of the fuel with the main charge of air to the cylinders, that is there may be used the usual carburetor for supplying fuel to the main charge instead of the injection means as shown. My means is particularly the provision of the primary air and fuel charging means or system in connection with any form of supplying the main charge of air and fuel, and the provision by means of a special form of supplying such primary combustion charge. My means thus supplies a combustible stratified air and fuel charge and provides means for the substantial separation of this charge during the compression period while at the same time permitting free communication during combustion cycle or period.

While I have shown particular devices and combinations of devices in the illustration of my invention, I contemplate that other detailed devices and combinations of devices may be used in the realization of my invention without departing from the spirit and contemplation of my invention.

What is claimed is:

1. A plurality of main combustion chambers and cooperating driven means, means for charging each main combustion chamber periodically with air, a plurality of supplementary chambers each related to and communicating with an individual combustion chamber, a common source of air and fuel under pressure and in predetermined proportions, and a distributing means associated therewith for distributing in timed relation with the operation of the cooperating driven means, the mixture of air and fuel under pressure to the individual supplementary chambers, and a means subject to control for variation of the cyclic power delivery for delivering to the main combustion chambers main charges of fuel periodically.

2. A plurality of main combustion chambers and cooperating driven means, means for charging each main combustion chamber periodically with air, a plurality of supplementary chambers each related to and communicating with an individual combustion chamber, a common source of air and fuel under pressure and in predetermined proportions for effective combustion and a distributing means associated therewith for distributing in timed relation with the combustion cycle the mixture of air and fuel to the individual supplementary chambers, means for periodically charging each main combustion chamber with air for combustion therein, and a means subject to control for delivering periodically to each main combustion chamber a charge of fuel.

3. A plurality of main combustion chambers and cooperating driven means, means for charging each main combustion chamber periodically with air, a plurality of supplementary combustion chambers each related to and communicating with each individual combustion chamber, a common source of air and fuel under pressure and in predetermined proportions for effective combustion, and a distributing means associated therewith for periodically delivering a charge of the mixture under pressure to each supplementary combustion chamber, and a means for periodically injecting to each main combustion chamber a charge of fuel and means for control of the volume of fuel delivery for each combustion cycle to the main combustion chambers.

4. A plurality of main combustion chambers and cooperating driven means, means for periodically charging each main combustion chamber with air, a plurality of supplementary combustion chambers each related to and communicating with each individual combustion chamber, a common source of air and fuel mixture under pressure and in predetermined proportions, and a means associated therewith for periodically delivering a charge of the mixture to each supplementary combustion chamber, a common source of scavenging air under pressure and a means for distributing charges thereof periodically to each supplementary combustion chamber in advance of the delivery of the air and fuel mixture charge thereto, and a means for periodically delivering to each main combustion chamber a charge of fuel.

5. A multiple cylinder engine, means for periodically charging each engine cylinder with air and for controlled delivery of fuel to each engine cylinder periodically, supplementary combustion chambers one for each engine cylinder and communicating individually therewith, a source of air and fuel in predetermined proportions and under pressure sufficient for delivery in accordance with the periodic time of delivery and an associated distributing means for periodically and cyclically in timed relation with the the combustion cycle of the cylinders permitting delivery of a charge of the mixture of air and fuel to each supplementary combustion chamber.

6. The means described in claim 5 and ignition means for each supplementary combustion chamber and means for controlling occurrence of the ignition periodically in each supplementary combustion chamber in timed relation with the combustion cycle of the engine cylinders individually.

ADOLPHE C. PETERSON.